Aug. 7, 1956   R. F. RAYMOND ET AL   2,758,042
SAFETY GLASS CONSTRUCTION
Filed Dec. 9, 1952

INVENTOR.
EMIL A. FUSCA and
RICHARD F. RAYMOND
BY
Oscar L. Spencer
ATTORNEY

United States Patent Office 2,758,042
Patented Aug. 7, 1956

2,758,042

SAFETY GLASS CONSTRUCTION

Richard F. Raymond, Saxonburg, and Emil A. Fusca, Pittsburgh, Pa., assignors to Pittsburgh Plate Glass Company Application December 9, 1952, Serial No. 324,882

10 Claims. (Cl. 154—2.71)

This invention relates to an improved safety glass assembly comprising a plurality of glass sheets bonded on opposite sides of a plastic interlayer and particularly, one in which provision is made for the prevention of chipping of the glass surfaces adjacent the interlayer due to the relatively high rate of contraction of the plastic interlayer compared with that of the glass.

In the field of safety glass construction, there are two general types of safety glass structures known in the art under the trade name of "Flexseal." These are the so-called "A" type units and the "B" type units. The "A" type consists of a sandwich of a pair of glass sheets of equal size having a vinyl plastic interlayer extending beyond the periphery of the glass sheets. This "A" type unit has been found inadequate for some uses because of the tendency of the plastic interlayer, which is the only element of this type of safety glass structure that is fastened to a window frame, to shear under heavy loads. This shearing action tends to allow the safety glass structure to part from the frame in which the unit is enclosed.

In order to overcome this inherent defect in the "A" type unit, the "B" type unit, which comprises two sheets of glass of unequal size, the smaller one of which is termed a cover plate, and the larger one of which is called a pressure plate, and a vinyl plastic interlayer sandwiched between and extending beyond the two sheets of glass, has been provided. In installing a "B" type unit, the plastic interlayer is fastened to a window frame as in the "A" type unit, but the pressure plate is disposed against the frame to help support the load. Therefore, the safety glass unit has less tendency to separate from the frame than an "A" type unit because it is necessary to shear the glass pressure plate as well as the plastic interlayer in order to separate the "B" type unit from its frame.

As conventional safety glass units are exposed to severe temperature variations involving low temperatures, the vinyl interlayer, having a higher coefficient of expansion than the glass, tends to contract more rapidly than the pressure plate. This difference in contraction causes the glass to be stressed as the plastic interlayer tends to curl away from the extended portion of the pressure plate, thereby resulting in chips formed on the glass surface. This tendency to chip is known in the art as "cold chipping." Sometimes these stresses are so great as to cause a complete fracturing of the pressure plate.

"Cold chipping" is especially inherent in type "B" units. This inherent characteristic has been attributed to the lack of balance on opposite sides of the plastic interlayer due to the difference in dimensions between the cover plate and the pressure plate. It has been discovered that by placing a reinforcing frame of suitable width and thickness of a material having a coefficient of expansion substantially equal to that of glass, such as aluminum, steel, or glass about the periphery of the cover plate, that it will compensate for the unbalanced condition of the cover plate and minimize cold chipping of this so-called "offset area" of the pressure plate. In other words, by attaching a rigid reinforcing frame to the plastic on or adjacent the surface opposite the surface attached to the extension of the pressure plate, the desired balance is obtained. The mechanism for obtaining this balance is believed to be as follows. Attachment of the reinforcing frame to the plastic according to the teaching of our invention results in a tendency of the plastic interlayer to curl at its surface adjacent the reinforcing frame in the opposite sense to the curling tendency at the surface adjacent the pressure plate extension. The vector sum of these two opposing curling components results in less stress on the periphery of the pressure plate, and, hence, less tendency for "cold chipping" to occur.

It is therefore an object of the present invention to improve laminated safety glass in order to eliminate cold chipping.

Another object of the present invention is to provide a "B" type laminated safety glass unit which combines the benefit of having a strengthened structure inserted within an enclosing window frame and also which is free from surface defects caused by the exposure of the safety glass structure to exceedingly low temperatures.

Still another object of the present invention is to balance an unbalanced safety glass assembly by a suitable reinforcing frame so as to eliminate the susceptibility of the glass to cold chipping.

These and other objects will be apparent upon a study of the accompanying description taken in connection with the enclosed drawings. It is to be understood, however, that the scope of the present invention is not limited by the description of the specific embodiment contained in the specification but only by the scope of the appended claims.

Figure 1:
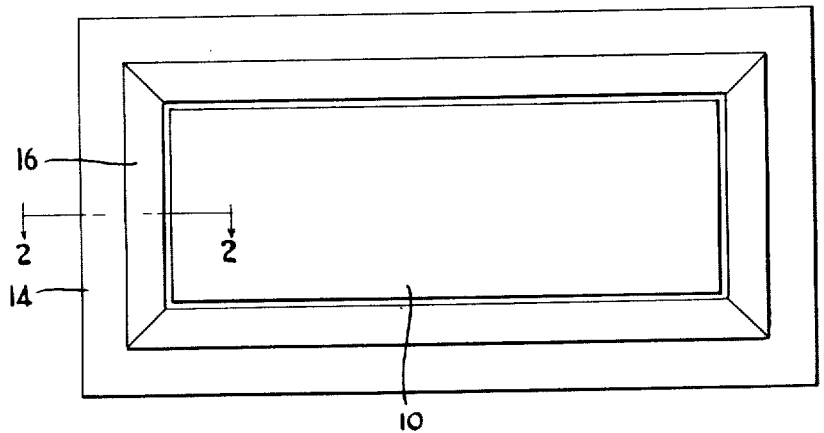
Figure 1 represents a plan view of one embodiment of the present invention.
Figure 2:
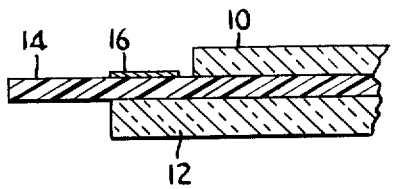
Figure 2 represents a cross sectional view along the lines 2—2 of Figure 1.

As shown in the embodiment of Figures 1 and 2, a cover plate 10 of a transparent substance such as glass and a pressure plate 12 of a material such as used in plate 10 and having dimensions greater than those of the cover plate have sandwiched therebetween and extending beyond the boundaries thereof an interlayer 14 of a plastic material such as a vinyl acetal, for example, polyvinyl butyral. On top of the interlayer 14 surrounding the face plate and oppositely disposed from and masking the edge of the pressure plate 12 is a reinforcing or balancing frame 16. This reinforcement may comprise strips mitered at the corners as shown in the drawing or may comprise an integral peripheral frame to provide a substantially complete peripheral reinforcement of the vinyl butyral interlayer aligned with the plastic glass bond formed on the pressure plate side of the interlayer in the offset area where the pressure plate extends beyond the cover plate. While the reinforcement is described as completely encircling the cover plate, fairly good results can be obtained by the application of two pairs of parallel strips that are not mitered at the corners, provided the reinforcing strips extend substantially around the periphery of the cover plate. Also, the width of the balancing reinforcement 16 need not be limited to the offset portion of the pressure plate extending beyond the face plate as shown in Fig. 2, but may extend as far as necessary toward the edge of the interlayer 14 to provide a balance to offset the unbalance caused by the difference of adhesion surfaces between the plastic interlayer and the two opposing glass sheets.

Figure 3:
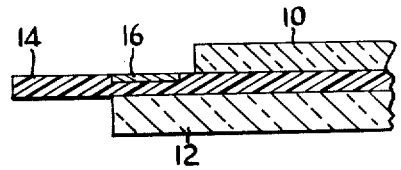
Figure 3 represents a view similar to Figure 2 of an alternate embodiment of the invention.

The embodiment of Figure 3 is similar to that of Figures 1 and 2 except that the reinforcing frame 16 is embedded in the plastic interlayer in grooves formed therein on the side of the interlayer facing the cover plate.

Figure 4:
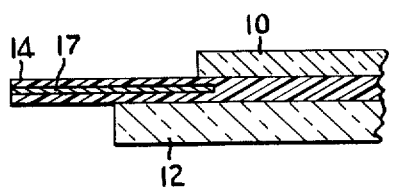
Figure 4 represents a view similar to Figures 2 and 3 showing a conventional reinforcing structure typical of the prior art.

In Figure 4 is shown a portion of a "B" type laminated unit that is conventionally reinforced by the provision of reinforcements 17 of aluminum or other material readily bondable to the plastic. Reinforcements 17 extend inwardly from the periphery of the plastic interlayer 14 to within the periphery of the pressure plate 12 and in some instances as far inwardly as within the periphery of the cover plate 10 in a plane that is approximately midway between the upper and lower surfaces of the interlayer and parallel thereto. While these reinforcements 17 are substantially coextensive with the periphery of the interlayer, units so provided are well known to be subject to cold chipping.

Figure 5:
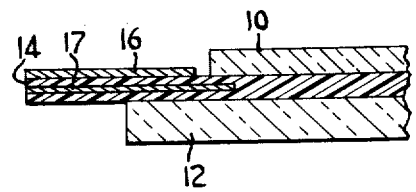
Figure 5 is a view similar to those of Figures 2, 3 and 4, showing the features of still another embodiment of the invention.

However, if the conventional embodiment depicted in Figure 4 is additionally provided as shown in Figure 5 with a balancing frame 16 applied to the conventionally reinforced plastic interlayer in the manner depicted in Figure 2 or 3 for assemblies provided with non-reinforced interlayers, the resistance of the assembly to cold chipping is surprisingly greatly increased. It therefore becomes apparent that the exact location of the reinforcement frame 16 is of great importance in eliminating the undesirable characteristic of cold chipping from laminated assemblies.

The manufacture of the improved assembly may be accomplished utilizing the same process now used in manufacturing unimproved laminated safety glass units. Thus, in lieu of laminating an unimproved assembly in an autoclave, the improved assembly including the reinforcing frame 16 is pressed in an autoclave in a manner similar to that used presently for unimproved units. The resulting bond obtained between the reinforcing members and the plastic interlayer is very strong and is not apt to be separated in use.

Another method suitable for balancing an unbalanced or "B" type of laminated glass assembly envisions adhering the balancing strips or frame 16 to a conventionally bonded assembly. Any suitable adhesive may be used, for example, the epoxide type of adhesive, the acrylates, the vinyl acetals or a butadiene acrylonitrile adhesive.

When the improved laminated assembly is exposed to very low temperatures, the presence of the balancing frame 16 inhibits the tendency of the plastic interlayer 14 to mar the pressure plate 12 as the interlayer contracts more rapidly than the glass comprising the pressure plate by virtue of the stiffening effect imparted to the plastic interlayer by the balancing frame.

The frame 16 may be of glass or any metal that has a coefficient of linear expansion substantially equal to that of glass and is bondable to the plastic interlayer by the autoclave pressing process, as well as any material that may be adhesively connected to the plastic. In order for the device to operate most effectively, it is desirable that the entire assembly remain a "B" type unit wherein the pressure plate 12 extends beyond the edge of the glass plate 10 and the thickness of the reinforcement frame members is required to be such that the total thickness of the pressure plate 12, plastic interlayer 14 and reinforcing member 16 is not as great as the assembly comprising the pressure plate 12, plastic interlayer 14 and the cover plate 10.

The thickness of the reinforcing balancing members used most frequently has been approximately .064 inches. However, this thickness is not to be considered the only thickness suitable for use in the present invention, for the thickness can vary from the thinnest sheet that can be formed from the balancing material to a maximum thickness slightly less than that of the cover sheet depending on the amount of thickness required for balancing.

Various experiments were accomplished at the Pittsburgh Plate Glass Company Research Laboratory at Creighton, Pennsylvania, in order to determine the merits of the present invention as depicted in the embodiments exemplified in Figures 2, 3 and 5. In these experiments, cover glass plates 10 having dimensions of 2" x 4" x 7/32" and pressure plates 12 having dimensions 4" x 6" x 1/4" were placed on opposite sides of a vinyl butyral sheet 14 having a thickness of 3/8". Eight assemblies were tested by successive exposure to temperatures of −20° F., −65° F., and −100° F. Two of these assemblies had a frame 16 of strip aluminum .060" thick bonded to the cover plate side of the plastic interlayer between the edge of the cover plate and the edge of the plastic interlayer and additional conventional reinforcing members 17 in the center of the interlayer thickness extending 1/4" into the laminate beneath the cover plate. Two additional samples had aluminum strips 16 bonded to the cover plate side of the vinyl interlayer only. Two additional sheets were provided with the aluminum reinforcements 17 within the interlayer only and the last two specimens did not have any reinforcements at all.

Three of the four samples provided with the aluminum strip on the side of the vinyl butyral facing the cover plate were still unchipped after exposure to −100° F. and the fourth sample began to show chipping at −65° F. The two samples provided with the aluminum strip in the center only failed by −20° F. as did the control specimens which were not provided with any metallic reinforcing members. It was concluded from these experiments that locating the aluminum reinforcing strips on the side of the plastic interlayer facing the cover plate between the edge of the cover plate and the edge of the plastic strip provides a much stronger unit that is more resistant to cold chipping than conventionally reinforced units.

It has been discovered that the amount of reinforcement required to balance an unbalanced sheet is determined by the thickness of the plastic interlayer, the difference in dimensions between the cover plate and the pressure plate and the material used as the reinforcement.

While a few typical embodiments of the present invention have been disclosed, it is to be understood that the scope of the invention is intended to include all obvious equivalents and combinations of the disclosed devices and to be limited only by the limitations contained in the accompanying claims.

What is claimed is:

1. A transparent laminated structure comprising a pressure plate of transparent relatively brittle material having a relatively low coefficient of expansion, a layer of relatively flexible transparent plastic material having one side integral with one side of said pressure plate, a cover plate of transparent material having a relatively high coefficient of expansion and smaller than said pressure plate and integral with the other side of the flexible plastic material, and a rigid strip of balancing material having a relatively low coefficient of expansion, said strip being integrally laminated with the other side of the flexible plastic material beyond the periphery of the cover plate, said transparent laminated structure being adapted to be mounted in a window frame.

2. A transparent laminated glass structure comprising two sheets of glass of different areas integral with an interposed layer of plastic material, and a marginal rigid strip of balancing material having a coefficient of expansion substantially lower than the coefficient of expansion of said plastic material, said strip being integrally laminated with the side of the plastic material facing the smaller glass sheet and surrounding same, said transparent laminated glass structure being adapted to be mounted in a window frame.

3. The structure recited in claim 2 wherein the thickness of the assembly in the marginal area including the strip of balancing material is less than the total thickness of the two sheets of glass plus the plastic interlayer.

4. The structure recited in claim 3 wherein the strip of balancing material comprises a metal easily bondable to the plastic interlayer.

5. The structure recited in claim 1 wherein the balancing material extends outwardly from the cover plate to a maximum limit defined by the periphery of the pressure plate.

6. A transparent laminated glass structure comprising two sheets of glass of different areas integral with an interposed layer of plastic material, and a rigid peripheral frame of balancing material having a coefficient of expansion substantially lower than the coefficient of expansion of said plastic material, said frame being integrally laminated with one surface of the plastic material extending beyond the smaller glass sheet, said extended portion of plastic material on its other surface being integral with the larger glass sheet and said transparent laminated glass structure being adapted to be mounted in a window frame.

7. A transparent glass structure comprising two sheets of glass of different areas bonded together by an interposed layer of plastic material, a groove in the side of the plastic layer bonded to the smaller glass sheet and aligned with the portion of the larger glass sheet extending beyond the periphery of the smaller glass sheet, said plastic layer on the other side being integral in the extended portion with the larger glass sheet, and a rigid strip of balancing material in the groove and having a coefficient of expansion substantially lower than the coefficient of expansion of said plastic material, said strip being integrally laminated with the plastic interlayer, said transparent laminated glass structure being adapted to be mounted in a window frame.

8. A transparent laminated structure comprising a sheet of relatively flexible material having a relatively high coefficient of expansion bonded at an interface to a sheet of relatively brittle material having a relatively low coefficient of expansion and a rigid strip of balancing material having a coefficient of expansion substantially lower than the coefficient of expansion of said flexible material and integrally laminated with the sheet of flexible material at the side opposite the interface, the portion of the integrally laminated rigid strip of balancing material aligned with the first-named sheet being aligned with the marginal portion of said interface and said transparent laminated structure being adapted to be mounted in a window frame.

9. A transparent laminated structure comprising a relatively flexible material having a relatively high coefficient of expansion bonded to a relatively brittle material having a relatively low coefficient of expansion, said relatively flexible material having a marginal groove in the surface opposite the surface bonded to the relatively brittle material and a rigid frame of balancing material having a relatively low coefficient of expansion, said frame being in the groove and integrally laminated with the flexible material at the side opposite and in substantial alignment with the marginal portion of the brittle material, said transparent laminated structure being adapted to be mounted in a window frame.

10. A transparent laminated structure comprising two sheets of glass of different areas, an interposed thermoplastic sheet comprising a central portion integral with both sheets of glass and a second portion, surrounding said central portion, having a surface integral with only the larger of said two glass sheets, and a rigid thin strip of balancing material having a coefficient of expansion substantially lower than the coefficient of expansion of said thermoplastic sheet and integrally laminated with the surface of said second portion opposite the surface integral with the larger glass sheet, said transparent laminated structure being adapted to be mounted in a window frame.

References Cited in the file of this patent

UNITED STATES PATENTS

| | | |
|---|---|---|
| 2,293,656 | McClain | Aug. 18, 1942 |
| 2,356,878 | Painter | Aug. 29, 1944 |
| 2,398,886 | Drake | Apr. 23, 1946 |
| 2,576,392 | Downes | Nov. 27, 1951 |
| 2,650,890 | Bledsoe | Sept. 1, 1953 |
| 2,679,467 | Sherts | May 25, 1954 |

Dedication 2,758,042.—*Richard F. Raymond*, Saxonburg, and *Emil A. Fusca*, Pittsburgh, Pa. SAFETY GLASS CONSTRUCTION. Patent dated Aug. 7, 1956. Dedication filed July 25, 1973, by the assignee, *PPG Industries, Inc.*

Hereby dedicates for the remainder of its term to the free use and benefit of the People of the United States.

[*Official Gazette January 8, 1974.*]